United States Patent
Callahan

(10) Patent No.: US 7,316,226 B2
(45) Date of Patent: Jan. 8, 2008

(54) HEATED PCV SYSTEM

(75) Inventor: Douglas J. Callahan, Rochester Hills, MI (US)

(73) Assignee: Miniature Precision Components, Inc., Walworth, WI (US)

( * ) Notice: Subject to any disclaimer, the term of this patent is extended or adjusted under 35 U.S.C. 154(b) by 86 days.

(21) Appl. No.: 10/907,986

(22) Filed: Apr. 22, 2005

(65) Prior Publication Data

US 2006/0236989 A1    Oct. 26, 2006

(51) Int. Cl.
F02B 75/18    (2006.01)
(52) U.S. Cl. .................... 123/572; 123/574
(58) Field of Classification Search ........ 123/572–574, 123/556, 184.21–184.61
See application file for complete search history.

(56) References Cited

U.S. PATENT DOCUMENTS

| | | | |
|---|---|---|---|
| 1,693,355 A | 11/1928 | Thompson | |
| 2,481,713 A | 9/1949 | Bertea | |
| 2,742,057 A | 4/1956 | Krieck | |
| 2,744,727 A | 5/1956 | Osburn | |
| 2,926,690 A | 3/1960 | Martin | |
| 3,056,420 A | 10/1962 | Dietrich | |
| 3,111,138 A | 11/1963 | Humphreys et al. | |
| 3,359,960 A | 12/1967 | Pittsley | |
| 3,439,703 A | 4/1969 | Toda et al. | |
| 3,545,242 A | 12/1970 | Dean | |
| 3,588,041 A | 6/1971 | Johannisson | |
| 3,661,128 A | 5/1972 | Eshelman | |
| 3,742,701 A | 7/1973 | Feemster et al. | |
| 3,766,898 A | 10/1973 | McMullen | |
| 3,809,111 A | 5/1974 | Olsson | |
| 4,068,628 A | 1/1978 | Duckworth | |
| 4,069,796 A * | 1/1978 | Balsley | 123/547 |
| 4,089,214 A * | 5/1978 | Egami et al. | 73/116 |
| 4,171,712 A | 10/1979 | DeForrest | |
| 4,177,778 A * | 12/1979 | Naitou et al. | 123/549 |
| 4,498,499 A | 2/1985 | Knorreck et al. | |
| 4,517,951 A | 5/1985 | Otaka et al. | |
| 5,068,188 A | 11/1991 | Wise et al. | |
| 5,425,347 A | 6/1995 | Zinke, II | |
| 5,697,351 A | 12/1997 | Schumacher | |
| 5,878,731 A | 3/1999 | Bedkowski | |
| 6,044,829 A | 4/2000 | Butz et al. | |
| 6,412,479 B1 | 7/2002 | Canfield et al. | |
| 6,546,921 B1 | 4/2003 | Callahan | |
| 6,640,793 B1 * | 11/2003 | Kabat et al. | 123/574 |
| 7,017,562 B2 * | 3/2006 | Jeon | 123/572 |
| 2004/0206343 A1 * | 10/2004 | Oota et al. | 123/572 |

* cited by examiner

*Primary Examiner*—Marguerite McMahon
(74) *Attorney, Agent, or Firm*—Dickinson Wright PLLC

(57) ABSTRACT

A PCV system includes heated PCV valve for metering a flow of crankcase gases therethrough and a heated inlet manifold fitting for receiving a flow of crankcase gases therethrough. The PCV valve and the heated inlet manifold fitting are in communication with a current source to apply current to heaters associated with each as required.

4 Claims, 5 Drawing Sheets

HEATED PCV SYSTEM

TECHNICAL FIELD

The present invention relates generally to positive crankcase ventilation systems (PCV systems) for internal combustion engines (IC engines), and more particularly to a heated PCV system including a heated PCV valve and heated intake manifold fitting for allowing the proper operation of the PCV system in cold environments.

BACKGROUND OF THE INVENTION

Positive crankcase ventilation systems (PCV systems) are known for removing crankcase gases from internal combustion engines (IC engines) and controlling emissions therefrom. Crankcase gases include blowby gases, which are small amounts of fumes and unburned fuel-air mixtures that bypass the pistons and the piston rings during operation of the IC engine.

PCV systems typically route crankcase gases from the crankcase to the intake manifold. The crankcase gases are then combined with the fuel-air mixture and drawn back into the cylinders for combustion. The resulting fumes are ultimately carried to a catalytic converter where they are treated for release into the atmosphere.

A typical PCV system uses a positive crankcase ventilation valve (PCV valve) to meter the flow of crankcase gases from the crankcase to the intake manifold. The PCV valve has an orifice through which the crankcase gases flow. The orifice may be formed within a washer that is insert molded into the body of the PCV valve or otherwise provided by other suitable means. Also, the valve ordinarily uses a plunger to obstruct the flow of crankcase gases through the orifice of the valve. A common design for the PCV valve requires that the plunger is oriented in a manner that manifold vacuum draws the plunger toward the orifice of the valve. The plunger usually has a spring or other biasing member coupled thereto for forcing the plunger away from the orifice. The force of the spring is balanced with manifold vacuum to determine the degree to which the plunger obstructs the flow of crankcase gases. This balance regulates the flow of crankcase gases through the PCV valve to remove crankcase gases from the crankcase at the same rate they accumulate therein.

In particular, crankcase gases typically accumulate within the crankcase at a rate in direct relation to engine speed. For example, the accumulation rate is minimal at engine idle and increases during higher engine speeds. Moreover, the engine speed is typically inversely proportional to manifold vacuum. Manifold vacuum is high at engine idle and decreases at higher engine speeds. A high manifold vacuum may overcome the force of the spring and draw the plunger sufficiently toward the orifice to decrease the flow of gases exiting the crankcase. Alternatively, a lower manifold vacuum may be overpowered by the force of the spring in that the plunger is not drawn as close to the orifice. Thus, crankcase gases are removed from the crankcase at a similar rate as they accumulate therein.

In addition to removing crankcase gases, an open-type PCV system also supplies fresh air to the crankcase. The fresh air is normally drawn from an air intake through a PCV closure tube into the crankcase. Since the incoming air typically has moisture, water may build up within the crankcase. Unfortunately, the presence of water within the crankcase may cause existing PCV systems to fail in cold environments, e.g. environments where the temperature is −40 C or below. Additionally, the presence of water within the crankcase may also cause existing PCV systems to fail when ambient temperatures are at or below freezing. It is known that moisture in the crankcase may mix with blowby gases and then flow through the PCV valve into the intake manifold. As the gases mix with the cold air in the intake manifold, ice may form and block the PCV valve. Meanwhile, blowby gases may continue to enter the crankcase thereby causing positive pressure to build within the crankcase.

The positive pressure can cause an adverse effect known as backflow. Backflow is the condition where flow in the PCV closure tube is reversed. The positive pressure causes crankcase gases within the crankcase to flow through the PCV closure tube into the air intake. Moisture in the crankcase gases may freeze within the air intake as a result of the low temperature of the fresh air and the substantial drop in pressure of the gases as they enter the air intake. A block of ice may subsequently break free and be drawn into the throttle body where it wedges the throttle plate into an open position. Obviously, such an adverse result may cause serious safety problems.

Another problem associated with the build up of positive pressure within the crankcase is that it may cause an engine seal to fail. The compromised seal would then allow motor oil to escape from the engine consequently leading to loss of engine function. Furthermore, the failure of the engine seal may allow blowby gases to escape into the atmosphere without first having been burned in the engine or treated by the catalytic converter. These blowby gases typically contain hydrocarbon and carbon monoxide vapors, which are known to be poisonous to the environment. Consequently, the release of these gases is an undesirable result.

Still another problem resulting from a PCV valve blocked by ice is that crankcase gases may contaminate the motor oil. Low levels of contamination may reduce the life of the oil, whereas higher levels may lead to engine failure. In this regard, sufficient contamination may transform the oil into a heavy sludge thereby depriving the engine of needed oil. As a result, parts of the engine are left unprotected and may subsequently lead to bearing failure. In addition, these parts may also corrode to the extent of causing engine failure.

Solutions have been proposed to address freezing in a PCV system. One such solution is disclosed in U.S. Pat. No. 6,546,921 and includes a heated PCV valve for properly heating the flow of crankcase gases drawn into the intake of the manifold. This solution successfully minimizes freezing of the PCV valve, but does not solve the problem of freezing at other locations in the PCV system, including the inlet to the manifold. Another proposed solution for addressing freezing at other locations in the system involves utilizing the engine coolant to "water-heat" the PCV valve and/or the intake manifold inlet port. This later solution requires the inclusion of additional piping or tubing to direct the flow of engine coolant to a desired location in the PCV system. However, this solution does not allow for accurate control of the amount of heat to be provided to the desired location and is also relatively inefficient and costly.

Still another proposed solution for addressing freezing involves the placement of a heating device in the manifold itself. This device only heats the gases at the location where the fresh air and the crankcase gases mix. The heating device thus fails to provide any heat to the crankcase gases as they flow from the crankcase to the manifold through its inlet. Moisture in the crankcase gases may condense and ice may form as the crankcase gases travel from the crankcase to the discharge port. In this regard, the ice may impede or even completely block the flow of crankcase gases to the intake manifold. As a result, the PCV system may no longer operate properly and the various problems described above may arise. This manifold heating device also suffers from a variety of other problems, including larger failure issues as the wires are soldered directly to weld pads on the heater. These solder connections are more prone to failure.

Therefore, it would be desirable to provide a PCV system that minimizes any freezing issues due to the flow of crankcase gases and allows the PCV system to operate in cold environments. It would also be desirable to provide a PCV system that is more efficient and less costly than prior systems.

SUMMARY OF THE INVENTION

It is one advantage of the present invention to provide a heated PCV system that addresses PCV freezing issues at various locations throughout the PCV system.

It is a related object of the present invention to provide a heated PCV system that functions properly despite an environment that is sufficiently cold that moisture within the engine may freeze and block the flow of crankcase gases and thereby damage the engine.

It is another advantage of the present invention to provide a heated PCV system that addresses freezing issues at multiple locations in a more cost effective manner.

It is still another advantage of the present invention to provide a heated PCV system that delivers heat to potential problem areas within the system quicker than conventional systems and thereby minimizes freezing issues.

It is yet another advantage of the present invention to provide a heated PCV system that applies heat to multiple critical areas within the system.

It is a further advantage of the present invention to provide a heated PCV system that is easier and less expensive to install than prior systems.

In accordance with the above and the other advantages of the present invention, an improved PCV system is provided. The system includes a heated PCV valve in communication with a current source. The PCV valve is in communication with a cylinder head cover chamber and includes a heating element for heating the flow of crankcase gases in the manifold. The current source is also in communication with a heated inlet manifold fitting, which is disposed at the manifold inlet. The heated inlet manifold fitting also includes a heating element to heat the crankcase gases as they enter the manifold. Each of the heated PCV valve and the heated inlet manifold fitting is operatively connected to the current source to provide power to the devices as required.

The present invention reduces the adverse effects of crankcase gases within IC engines at multiple locations in the PCV system and decreases environmental pollution in cold environments as low as –40 C. In carrying out the present invention, a heated PCV valve and a heated inlet manifold fitting are integrated within a PCV system of an IC engine to properly heat the flow of crankcase gases drawn into the intake manifold.

Other advantages of the present invention will become apparent when viewed in light of the detailed description of the preferred embodiment when taken in conjunction with the attached drawings and appended claims.

BRIEF DESCRIPTION OF THE DRAWINGS

For a more complete understanding of this invention, reference should now be made to the embodiments illustrated in greater detail in the accompanying drawings and described below by way of examples of the invention.

DESCRIPTION OF THE PREFERRED EMBODIMENT

Figure 1:
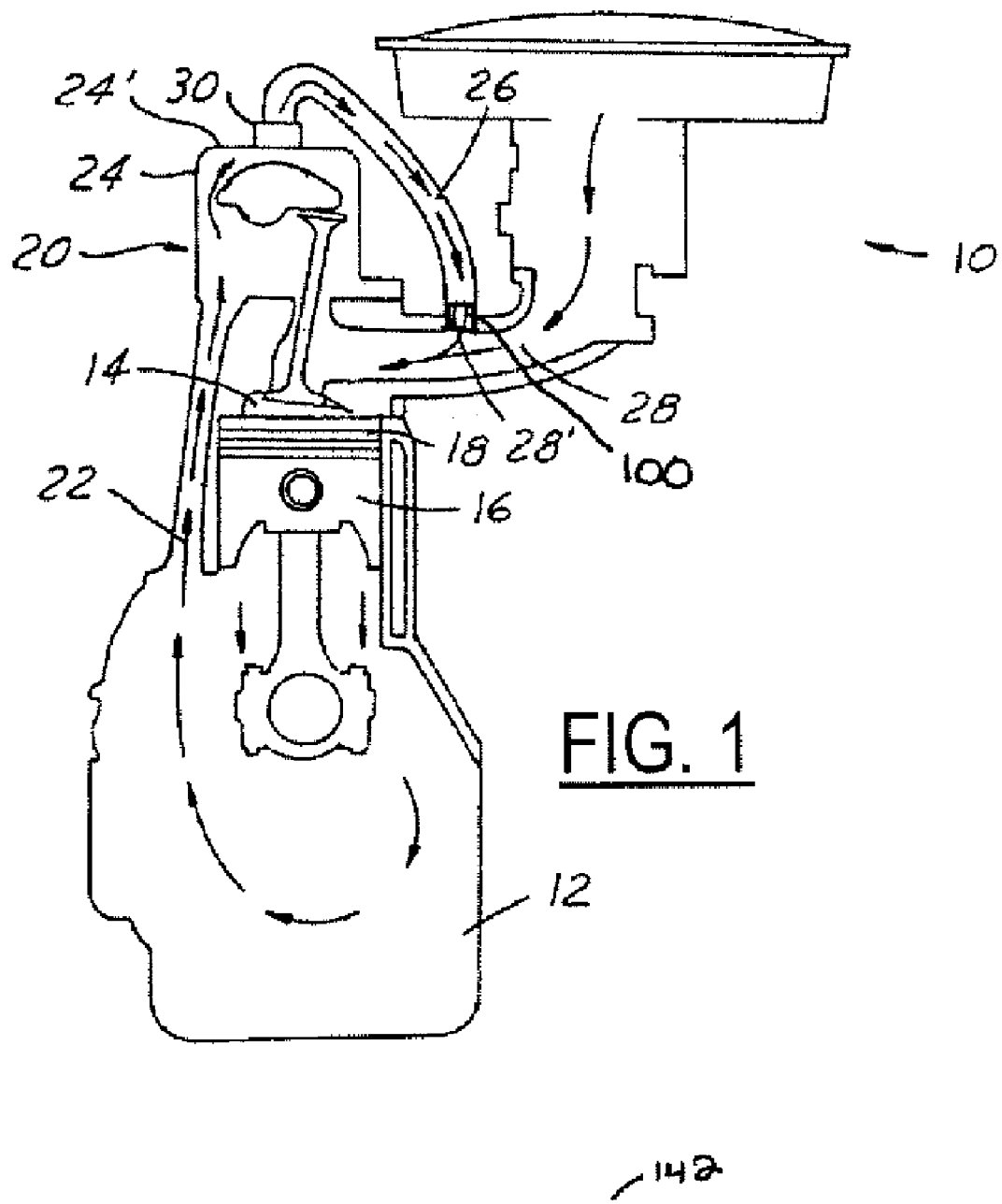
FIG. 1 is a schematic illustration of a PCV system within an internal combustion engine in accordance with one embodiment of the invention.

In the following figures, the same reference numerals are used to identify the same components in the various views.

Referring to FIG. 1, there is generally shown a diagrammatic representation of a positive crankcase ventilation system 20 (PCV system) within an internal combustion engine 10 (IC engine) according to a preferred embodiment of the present invention. The PCV system 20 routes crankcase gases from a crankcase 12 to a combustion chamber 14 where they are burned. Thereafter, the fumes are preferably carried to a catalytic converter (not shown) where they are treated for release into the atmosphere. As a person or ordinary skill in the art will understand, crankcase gases include blowby gases, which are the fumes and unburned fuel-air mixtures that bypass a piston 16 and a piston ring 18 during operation of an engine 10. The PCV system 20 includes a first conduit 22 for permitting the crankcase gases to travel from the crankcase 12 to a cylinder head cover chamber 24. The first conduit 22 may be a hose or any other suitable passageway for transferring the crankcase gases. The cylinder head cover chamber 24 is defined by a cam cover 24'. The cam cover 24' has a heated PCV valve 30 integrated therein for regulating flow of crankcase gases out of the cylinder head chamber 24.

The heated PCV valve 30 is preferably controlled in a manner that allows flow of crankcase gases therethrough at approximately the same rate as crankcase gases flow into the crankcase 12. The valve 30 may be regulated accordingly by using manifold vacuum induced by engine speed. In general, a high vacuum causes the PCV valve 30 to restrict the flow of gases therethrough, whereas a lower vacuum permits a higher flow therethrough. Further, a high manifold vacuum is induced by low engine speeds, such as engine idle, whereas a lower manifold vacuum is created by higher engine speeds. Consequently, the flow of crankcase gases is restricted at lower engine speeds when less crankcase gases are created. In contrast, the flow of crankcase gases becomes less restricted at higher engine speeds when more crankcase gases are created.

Figure 2:
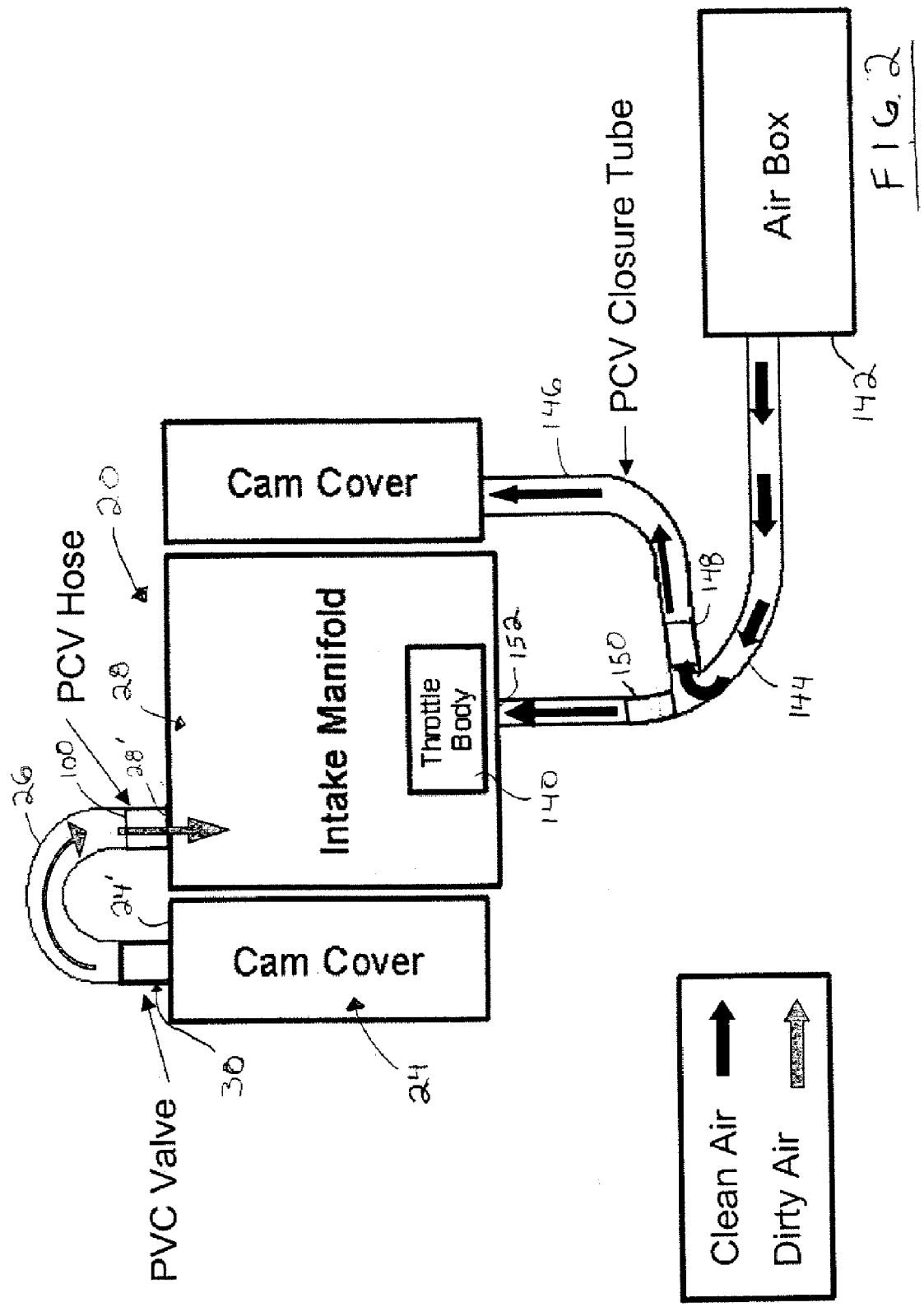
FIG. 2 is a schematic illustration of a PCV system including a heated PCV valve and a heated inlet manifold device in accordance with one embodiment of the present invention.

FIG. 2 is a schematic illustration of a PCV system 20 in accordance with another embodiment of the present invention. In this embodiment, the PCV system 20 includes a PCV valve 30 and a manifold inlet fitting 100. The PCV valve 30 is located on the cam cover 24' for regulating the flow of crankcase gases out of the cylinder head chamber 24. After passing through the heated PCV valve 30 from the cylinder head chamber 24, the crankcase gases flow through a second conduit 26 to an intake manifold 28. The second conduit 26 may be a hose or any other suitable passageway for transferring the crankcase gases. Moreover, the second conduit 26 is operatively coupled to an intake port 28' of the manifold 28. In this embodiment, a heated inlet manifold fitting 100 is disposed in the intake port 28' of the manifold 28 to heat the crankcase gases as they enter the manifold. In one embodiment, the heated inlet manifold fitting 100 may be integrated into the manifold inlet 28.

In the intake manifold 28, the crankcase gases mix with the fuel-air mixture. The resulting mixture is then drawn into the combustion chamber 14 of the engine where it is burned. Thereafter, the fumes are preferably carried to a catalytic converter for proper treatment before releasing them into the atmosphere.

In an alternative embodiment, the PCV valve 30 may be integrated within the crankcase 12 such that crankcase gases flow directly from the crankcase 12 through the PCV valve 30 into a throttle body (not shown). The crankcase gases may then flow into the combustion chamber 14 of the engine 10 where they are burned and ultimately carried to the catalytic converter. Although two examples of PCV systems 20 are described above, it is obvious to a person skilled in the art that a variety of other PCV systems 20 may be employed.

It will also be understood that the intake manifold 28 generally includes a throttle body 140. The throttle body 140 is in communication with an air filter box 142. By an air induction tube 144 to allow filter air to enter the throttle body 140. Additionally, an air tube/PCV closure tube 146, such as a hose, connects the air induction tube 144 to the cam cover 24'. This PCV closure tube 146 allows filtered air to enter the crankcase when the crankcase gases are pulled through the PCV valve 30. In accordance with another embodiment, a heated device 148 is disposed in the air tube. Further, a heating device 150 may be disposed in line with the PCV closure tube 146. Alternatively, the heating device 150 may be disposed in the induction tube port 152. The heating devices 148, 150 may be disposed anywhere along their respective tubes. Additionally, the heating devices 148, 150 may be used individually or collectively.

Figure 3:
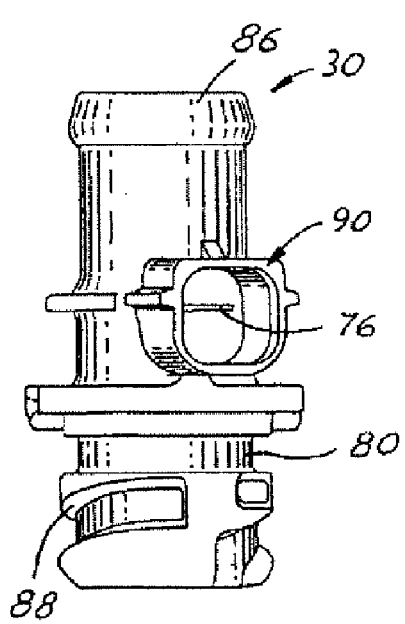
FIG. 3 is a perspective view of a PCV valve in accordance with one embodiment of the present invention.
Figure 4:
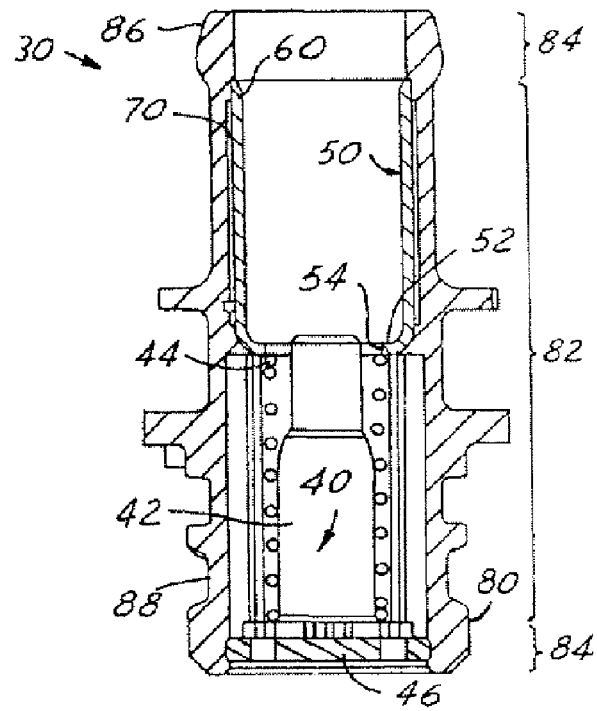
FIG. 4 is a cross-sectional view of the PCV valve shown in FIG. 6.

Referring now to FIGS. 3 and 4, there is generally illustrated a heated PCV valve 30 according to a preferred embodiment of the present invention. FIG. 3 is a perspective view of the PCV valve 30, and FIG. 4 is a cross-sectional view of the PCV valve 30. The heated PCV valve 30 preferably includes a valve body 80 having an intermediate portion 82 and opposing end portions 84. The intermediate portion 84 has a heating element 50 contained therein for heating the crankcase gases passing through the valve 30. Also, the intermediate portion 82 preferably has the plunger and spring assembly 40 contained therein for regulating the flow of crankcase gases through the PCV valve 30. The heating element 50 and the plunger and spring assembly 40 are preferably disposed directly adjacent to each other within the intermediate portion. However, the heating element 50 and the plunger and spring assembly 40 may also be disposed within the same region of the intermediate portion 82 such that the heating element surrounds the plunger and spring assembly 40. Of course, the heating element 50 and the plunger and spring assembly 40 may be otherwise oriented within the valve body 80 as desired.

Figure 5:
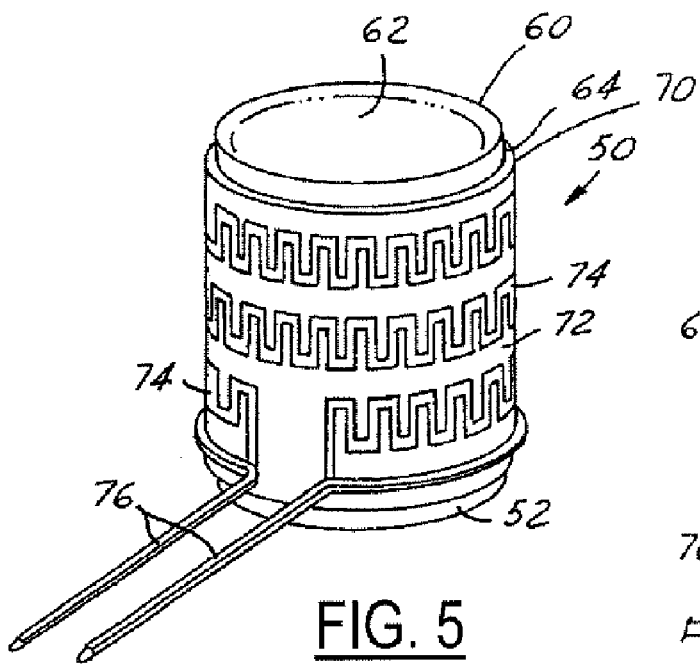
FIG. 5 is a perspective view of a heating element consisting of a heat sink with a resistance heating member coupled thereto, in accordance with one embodiment of the present invention.
Figure 6:
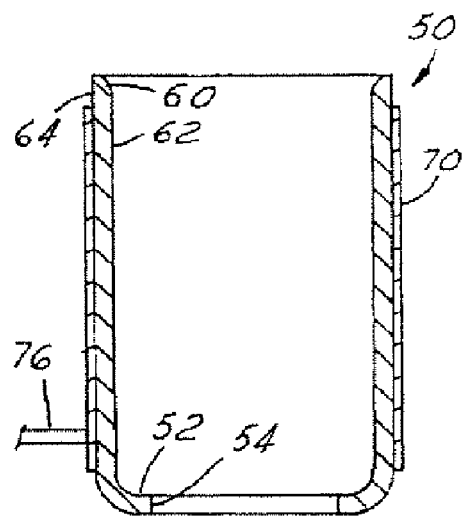
FIG. 6 is a cross-sectional view of a heating element consisting of a heat sink with a resistance heating member coupled thereto, in accordance with one embodiment of the present invention.

As best shown in FIGS. 5 and 6, the heating element 50 preferably includes a heat sink 60 with a resistance heating member 70 coupled thereto. The heat sink 60 preferably is a thermally conductive metal cup defined by an inner surface 62, an outer surface 64, and a bottom wall 52 having an orifice 54 integrally formed therethrough at its center. Preferably, the inner surface 62 is directly exposed to the flow of crankcase gases, and the outer surface 64 has the resistance heating member 70 attached thereto. Of course, the heat sink 60 may be other suitable mechanisms as desired. Also, the orientation of the heat sink 60 and resistance heating member 70 may be other suitable arrangements.

The resistance heating member 70 preferably includes a substrate 72 with a conductive circuit 74 therein having a positive thermal coefficient (PTC) of electrical resistance. The substrate 72 may be composed of polyester, silicon, or other suitable materials. As the temperature of the circuit 74 increases, the resistance of the circuit 74 increases, as well. Thus, less current flows through the circuit 74 as its temperature increases. In this regard, the PTC heater is self-regulating and generates heat until a maximum threshold temperature is reached. Power is supplied to the PTC heater through two electrical terminals 76 soldered to the circuit 74. Obviously, the resistance heating member 70 may be a PTC heater or other adequate heating devices as desired. For example, the resistance heating member 70 can be a conventional or regular type heater as will be understood by one of ordinary skill in the art. In an alternative embodiment, the heating element 50 may consist of a single heat source, e.g. a PTC heater, without a heat sink attached thereto.

Preferably, a bi-metal thermostat is operatively connected to the electrical terminals 76 and supplies power to the resistance heating member 70 when a minimum temperature threshold is reached. For example, the thermostat may supply power to the resistance heating member 70 when ambient temperature is 0 C or below.

The PCV valve 30 preferably uses a plunger and spring assembly 40 to meter the flow of crankcase gases through the orifice 54. The plunger and spring assembly 40 includes a plunger 42, a spring 44, and a retainer ring 46. The spring 44 preferably biases the plunger 42 away from the orifice 54. The plunger 42 extends into the orifice 54 to a particular degree so as to obstruct the flow of crankcase gases therethrough. The degree to which the plunger 42 extends into the orifice 54 depends upon the amount of manifold vacuum opposing the force of the spring 44. It is preferred that the plunger 42 increasingly obstruct the flow of crankcase gases through the orifice 54 as the manifold vacuum increases. The retainer ring 46 fastens to the valve body 80 so as to secure the plunger 42 and the spring 44 within the valve body 80. The connection between the retainer ring 46 and the valve body 80 may be accomplished by friction fit, snap-fit, or other suitable attachments.

In an alternative embodiment, the orifice 54 is sized sufficiently small that it only permits an approximately constant flow of gases to pass therethrough. In this regard, the orifice 54 itself regulates the flow of crankcase gases, and the plunger and spring assembly 40 is not required.

Typically, the rate of flow increases with the size of the orifice 54. Therefore, the desired rate of flow can be accomplished by sizing the orifice 54 accordingly.

According to the preferred embodiment, the valve body 80 further includes a barb 86 integrated within one end and a cam-lock fastener 88 integrated within an opposing end. The barb 86 serves as a detent for securing a connection between the valve body 80 and the second conduit 26. The cam-lock fastener 88 preferably is a groove formed within the valve body 80 for mating to an opposing fastener (not shown) within the cam cover 24'. However, it is clear that the valve body 80 may include a variety of other suitable fastener mechanisms for attaching to the engine.

The valve body 80 further includes an electrical connection portion 90. The electrical connection portion 90 extends radially outward from a longitudinal axis of the valve body 80 and partially encloses the electrical terminals 76. The electrical terminals 76 extend from the heating element 70 radially outward to connect to a power source.

Figure 7:
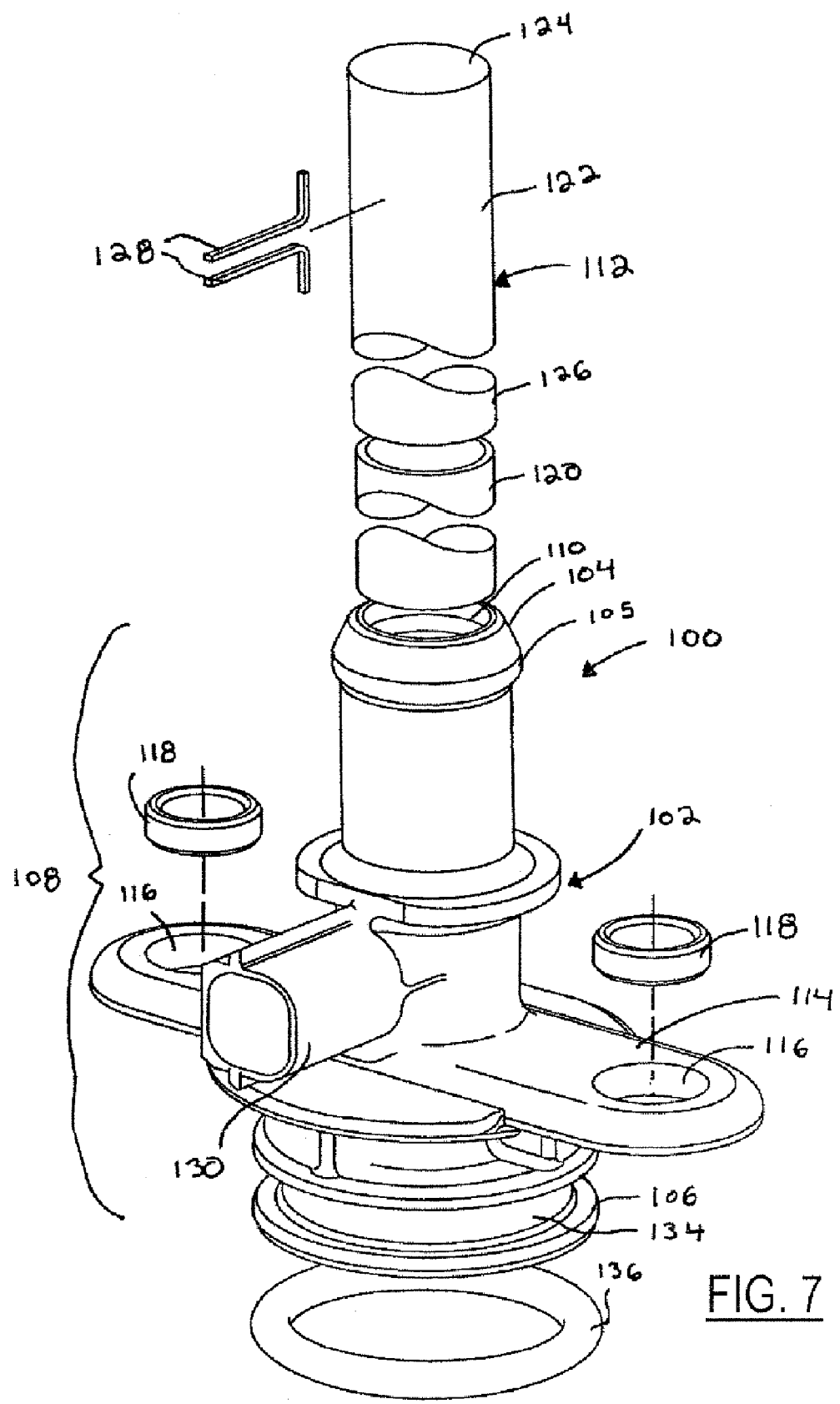
FIG. 7 is an exploded view of an inlet manifold device in accordance with one embodiment of the present invention.
Figure 8:
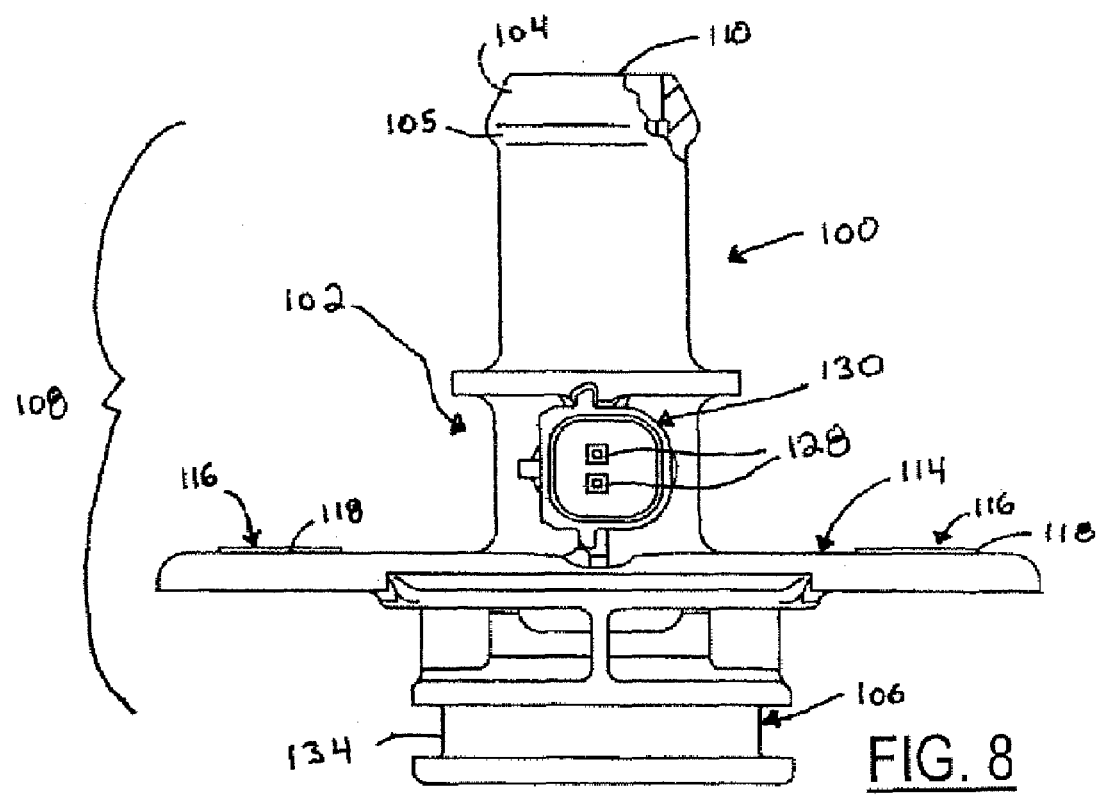
FIG. 8 is a front view of the inlet manifold device of FIG. 3.
Figure 9:
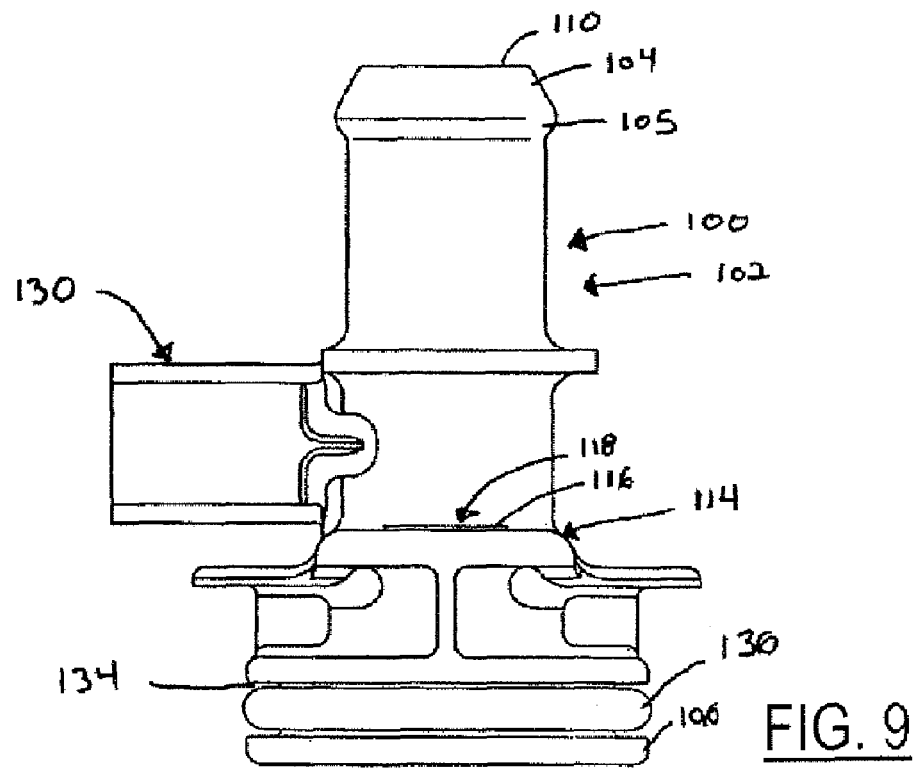
FIG. 9 is a side view of the inlet manifold device of FIG. 3.

Referring now to FIGS. 7 through 9, there is generally illustrated an inlet manifold device 100 in accordance with a preferred embodiment of the present invention. FIG. 7 is an exploded view of the inlet manifold fitting 100, while FIGS. 8 and 9 illustrate front and side views of the inlet manifold fitting 100, respectively. The inlet manifold device 100 preferably includes a body 102 having a top portion 104, a bottom portion 106, and an intermediate portion 108 disposed thereon.

The top portion 104 has an opening or orifice 110 formed therein. The top portion 104 is coupled to one end of the fluid conduit 26, such as by a barb 105, which serves as a detent for securing a connection between the body 102 and the second conduit 26. Obviously, other connection mechanisms may be utilized. The opening 110 is in fluid communication with crankcase gas that is passed thereto through the second conduit 26.

The intermediate portion 108 has a heating element 112 contained therein for heating the crankcase gases passing through the inlet manifold fitting 100. The intermediate portion 108 also includes an attachment portion 114 that allows the inlet manifold fitting 100 to be attached or otherwise secured to the manifold housing. The attachment portion 114 includes a pair of openings 116 that allow attachment of the inlet manifold fitting 100 to the manifold. A brass insert 118 is preferably disposed in each of the pair of openings 116 to assist in maintaining the inlet manifold device 100 in communication with the manifold housing. It will be understood that fasteners, such as screws, bolts, or other conventional fasteners may be utilized to pass through the openings 116 and secure the device 100 to the manifold housing.

The heating element 112 is preferably disposed within the intermediate portion 108. The heating element 112 preferably includes a heat sink 122 with a resistance heating member 120 coupled thereto. The heat sink 122 preferably is a thermally conductive metal cup defined by an inner surface 124, an outer surface 126, and a central bore. The inner surface 124 is preferably directly exposed to the flow of crankcase gases, and the outer surface 126 has the resistance heating member attached thereto. It will be understood that the heat sink 122 may be comprised of other suitable mechanisms as desired. Also, the orientation of the heat sink 122 and the resistance heating member 120 may take on a variety of other suitable arrangements.

The resistance heating member 120 for the inlet manifold fitting 100 is preferably the same as the resistance heating member 70, i.e. a PTC heater or other type of conventional resistance heater. The resistance heating member includes a pair of electrical terminals 128 that are soldered directly to an electrical circuit that is disposed on the outer surface 126. The pair of electrical terminals 128 form part of the electrical connecting portion 130.

The bottom portion 106 includes an attachment portion 132 that allows for attachment of the inlet manifold device 100 to the manifold housing at the inlet 28. The bottom portion 106 is preferably attached to the manifold by a cam-lock fastener 134, which is preferably a groove formed in the body 102. Moreover, an o-ring 136 is disposed in the bottom portion 108 to provide a seal and prevent the escape of crankcase gas. However, it will be understood that the device 100 may be attached to the manifold in a variety of other suitable ways, including threaded attachment, press-fitting, snap fitting, or the like. It will be understood that instead of a separate fitting 100, the fitting may be molded into the top shell of the manifold and connected directly to the second conduit 26.

In accordance with the present invention the formation of the inlet manifold fitting 100 is preferably accomplished as described below. Initially, a heat sink 122 is provided by forming a cup or cylinder with an orifice formed through its bottom. The cylinder may be formed by stamping a metal blank, machining a metal blank, injection molding a plastic doped with metal particles, or a variety of other suitable methods. Thereafter, a resistance heating member is attached to the outer surface 126 of the heat sink 122. The attachment between the heating member and the heat sink 122 may be accomplished using an epoxy, a pressure sensitive adhesive, or any other desired fastener.

Next, the terminals 128 are soldered to the resistance heating member to accomplish the transfer of power thereto. These terminals 128 are preferably metal pins for serving as a male electrical connector. The metal is sufficiently strong to withstand normal attachment and detachment to a female electrical connector. Thereafter, the heating element 120 is disposed within the body 102. This is preferably accomplished by insert molding the heating element 120 within the plastic body 102 or alternatively by any other suitable method. During the molding process, the electrical connecting portion 130 is formed and extends radially outward from the body 102 and partly encloses the pair of electrical terminals 128.

Referring now to FIG. 2, the PCV valve 30 and the inlet manifold fitting 100 are each connected by a wire harness 142 to the power source 144. In one embodiment, a single jumper harness is connected at one end to the source 144 and is spliced so that it connects to both the PCV valve and the inlet manifold fitting. In one preferred embodiment, the power source 144 is the vehicle battery. However, it will be understood that a variety of other power sources may be instead be utilized. Preferably, a single bi-metal thermostat is operatively connected to the electrical terminals 76 and 128 and allows the supply of power to the resistance heating members 70, 120 when a minimum temperature threshold is reached. For example, the thermostat may supply power to the resistance heating members 70 and 120 when the ambient temperature is 0° C. or below. Thus, a single power source and a single thermostat are utilized to supply heat to the PCV system.

Similarly, in accordance with the present invention, the heated PCV valve 30 is formed in accordance with the preferred embodiment as discussed below. Initially, the heat sink 60 is provided by forming a cup with an orifice 54 formed through its bottom. The cup may be formed by stamping a metal blank, machining a metal blank, injection molding a plastic material doped with metal particles, or a variety of other suitable methods. Thereafter, a resistance heating member 70 is attached to an outer surface 64 of the heat sink 60. The resistance heating member 70 preferably is a PTC heater as described above or any other suitable heating device. The attachment between the heating member 70 and the heat sink 60 may be accomplished using an epoxy, a pressure sensitive adhesive, or any other desired fastener.

Next, two terminals 76 are soldered to the resistance heating member 70 for providing power thereto. These terminals 76 preferably are metal pins for serving as a male electrical connector. The metal is sufficiently strong to withstand normal attachment and detachment to a female electrical connector. Then, the heating element 50, which includes the heat sink 60 and the resistance heating member 70, is disposed within a valve body 80. This is preferably accomplished by insert molding the heating element 50 within a plastic valve body 80 or alternatively by any other suitable method. The electrical terminals 76 are molded such that they extend outwardly of the valve body 80 allowing connection to a power source.

The plunger and spring assembly 40 is then inserted into the valve body. Preferably, the spring 44 is inserted first followed by the plunger 42 and then the retainer ring 46.

It will be understood that when the PCV system 20 includes a heating element 148 or 150 instead of or in addition to the inlet manifold fitting 100, all components of the PCV system 20 are electrically connected to the power source 144, such as by a wire harness 142. Again, it will be appreciated that the power source 144 is preferably the vehicle battery. However, a variety of other power sources may be utilized. In accordance with the present invention the PCV system 20 includes a PCV valve 30 and one or more other heating elements. The heating elements can be disposed in a variety of different locations in the system to prevent freezing in the PCV system 20. It will be appreciated that the heating elements 148, 150 can take on a variety of different configurations and may be included in valves or at the similar metering structures as desired.

While particular embodiments of the invention have been shown and described, numerous variations and alternate embodiments will occur to those skilled in the art. Accordingly, it is intended that the invention be limited only in terms of the appended claims.

What is claimed is:

1. A heated positive crankcase ventilation system comprising:
   a PCV valve for regulating the flow of crankcase gases out of a cylinder head of an internal combustion engine, said PCV valve including a heating element secured thereto;
   an inlet manifold fitting for heating crankcase gases as the gases enter a manifold, said inlet manifold fitting including a heating element secured thereto;
   a current source operatively connected to each of said PCV valve and said inlet manifold fitting to provide power to said respective heating elements; and
   a closure/make-up air tube heating element disposed in a closure/make-up air tube to heat air entering said cylinder head and where in said closure/make-up air tube heating element is operatively connected to said current source;
   whereby freezing in the positive crankcase ventilation is minimized.

2. A heated positive crankcase ventilation system, comprising:
   a first heating element in communication with a cam cover for heating crankcase gases exiting said cam cover;
   a second heating element for heating gases within the positive crankcase ventilation system, wherein said second heating element is disposed in a closure/make-up air tube that extends between an air induction tube and said cam cover; and
   a current source operatively connected to each of said first heating element and said second heating element to provide power to each of said heating elements;
   whereby freezing in the positive crankcase ventilation is minimized.

3. A heated positive crankcase ventilation system, comprising:
   a first heating element in communication with a cam cover for heating crankcase gases exiting said cam cover;
   a second heating element for heating gases within the positive crankcase ventilation system, wherein said second heating element is disposed in an air induction tube between an air supply and a throttle body;
   a third heating element disposed in a closure/make-up air tube that extends between an air induction tube and said cam cover and wherein said third heating element is operatively connected to said current source; and
   a current source operatively connected to each of said first heating element and said second heating element to provide power to each of said heating elements;
   whereby freezing in the positive crankcase ventilation is minimized.

4. A method of heating a positive crankcase ventilation system to minimize freezing therein, comprising:
   providing a PCV valve including a first heating element for regulating the flow of crankcase gases out of a cylinder head of an internal combustion engine;
   providing a second heating element for heating gases within the positive crankcase ventilation system, wherein said second heating element is disposed in a closure/make-up air tube that extends between an air induction tube and said cylinder head;
   operatively connecting a current source to said first heating element of said PCV valve and said second heating element; and
   controlling the application of power to said first heating element and said second heating element such that heat is applied within the system at predetermined conditions to minimize freezing.

* * * * *